(12) United States Patent
Hayes et al.

(10) Patent No.: US 10,050,674 B1
(45) Date of Patent: Aug. 14, 2018

(54) SYSTEM AND METHOD FOR CONTROLLING POWER LINE COMMUNICATIONS BETWEEN MEMBERS OF A TRACTOR-TRAILER

(71) Applicant: Bendix Commercial Vehicle Systems LLC, Elyria, OH (US)

(72) Inventors: Thomas J. Hayes, Lakewood, OH (US); Daniel P. Zula, North Ridgeville, OH (US); Timothy J. Frashure, Columbia Station, OH (US); Amit N. Chincholi, Solapur (IN); Jochen Retter, Holzgerlingen (DE)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/652,290

(22) Filed: Jul. 18, 2017

(51) Int. Cl.
| | |
|---|---|
| *H04B 3/00* | (2006.01) |
| *H04L 25/00* | (2006.01) |
| *H04B 3/54* | (2006.01) |
| *B60R 16/023* | (2006.01) |

(52) U.S. Cl.
CPC ........... *H04B 3/542* (2013.01); *B60R 16/023* (2013.01)

(58) Field of Classification Search
CPC ........ H04B 3/542; B60R 16/023; H02M 3/28; H03K 9/08
USPC .......................... 375/257, 258, 219, 220, 222
See application file for complete search history.

(56) References Cited

U.S. PATENT DOCUMENTS

| | | | |
|---|---|---|---|
| 5,397,924 A | 3/1995 | Gee et al. | |
| 5,796,359 A | 8/1998 | Beard | |
| 6,127,939 A | 10/2000 | Lesesky et al. | |
| 6,407,691 B1 * | 6/2002 | Yu | H02M 3/28 341/155 |
| 6,970,772 B2 | 11/2005 | Radtke et al. | |
| 7,382,301 B2 | 6/2008 | Mourrier | |
| 7,859,397 B2 | 12/2010 | Lamon et al. | |

(Continued)

FOREIGN PATENT DOCUMENTS

WO 2001072555 A1 10/2001

OTHER PUBLICATIONS

"DCAN500-CAN Over Powerline Communication," Yamar Electronics Ltd. (2008-2016).

(Continued)

*Primary Examiner* — Phuong Phu
(74) *Attorney, Agent, or Firm* — Reising Ethington P.C.

(57) ABSTRACT

A system and method for controlling communications between members of a tractor-trailer along a power line extending between the members are provided. The system includes an input signal conditioning circuit including an amplifier and conditioning stage configured to convert an analog input signal from the power line to a digital input signal. The system further includes a controller configured to receive the digital input signal, identify a communication protocol for the analog input signal from among a plurality of communication protocols responsive to the digital input signal and decode the digital input signal using the communication protocol. The controller may also identify a communication protocol for an output signal on the power line from among the plurality of communication protocols and encode a digital communication using the communication protocol.

26 Claims, 4 Drawing Sheets

(56) References Cited

U.S. PATENT DOCUMENTS

| 8,750,394 B2 | 6/2014 | Abad Molina et al. |
| 2007/0086514 A1 | 4/2007 | Lawrence |
| 2013/0148748 A1 | 6/2013 | Suda |
| 2015/0303910 A1* | 10/2015 | Zhu .......................... H03K 9/08 329/312 |
| 2016/0180605 A1 | 6/2016 | Zula |

OTHER PUBLICATIONS

"Power Line Communications for Commercial Vehicles," SAE International No. J2497 (Jun. 2007).
"SSC P485 PL Transceiver IC," Intellon Corporation (1998).

* cited by examiner

SYSTEM AND METHOD FOR CONTROLLING POWER LINE COMMUNICATIONS BETWEEN MEMBERS OF A TRACTOR-TRAILER

BACKGROUND OF THE INVENTION a. Field of the Invention

This invention relates to communications systems used in tractor-trailers. In particular, the invention relates to a system and method for controlling communications between members of a tractor-trailer along a power line extending between the members.

b. Background Art

Power line communication (PLC) is a communication method in which data is transmitted over wires that are also used to deliver electric power. The data is encoded within a signal that is transmitted over the wires in frequency ranges outside of those used to transmit electric power. PLC is advantageous relative to other communication methods because it enables communication using existing wiring. Tractor-trailers frequently employ (PLC) to exchange messages between members of the tractor-trailer including, for example, sensor readings from vehicle systems including anti-lock braking systems, collision avoidance systems, tire pressure monitoring systems and other vehicle systems as well as commands used to control anti-lock braking systems, lighting systems and other vehicle systems.

Tractor-trailers that implement PLC typically employ transceivers to interface between the vehicle power line and microprocessors and other electronic control systems used in the vehicle. The transceiver commonly used in the industry is a proprietary integrated circuit offered for sale by Qualcomm Atheros, Inc. under the name "SSC P485 PL Transceiver IC" that is intended to implement a communications protocol developed by the Society of Automotive Engineers (SAE) set forth in a document number J2497 and titled "Power Line Carrier Communications for Commercial Vehicles." The supply of the P485 chip is limited and the P485 chip is relatively expensive. More importantly, the P485 chip cannot handle communications sent using other communication protocols thereby limiting the ability of vehicle manufacturers to integrate devices and systems using other communication protocols.

The inventors herein have recognized a need for a system and method for controlling communications between members of a tractor-trailer along a power line extending between the members that will minimize and/or eliminate one or more of the above-identified deficiencies.

BRIEF SUMMARY OF THE INVENTION

This invention relates to communications systems used in tractor-trailers. In particular, the invention relates to a system and method for controlling communications between members of a tractor-trailer along a power line extending between the members.

A system for controlling communications between members of a tractor-trailer along a power line extending between the members in accordance with one embodiment includes an input signal conditioning circuit including an amplifier and conditioning stage configured to convert an analog input signal from the power line to a digital input signal. The system further includes a controller configured to receive the digital input signal, identify a communication protocol for the analog input signal from among a plurality of communication protocols responsive to the digital input signal, and decode the digital input signal using the communication protocol.

A method for controlling communications between members of a tractor-trailer along a power line extending between the members in accordance with one embodiment includes the step of converting an analog input signal from the power line to a digital input signal using an input signal conditioning circuit including an amplifier and conditioning stage. The method further includes the steps of identifying a communication protocol for the analog input signal from among a plurality of communication protocols responsive to the digital input signal and decoding the digital input signal using the communication protocol.

A system and method for controlling communications between members of a tractor-trailer along a power line extending between the members in accordance the present teachings represent an improvement as compared to conventional systems and methods. In particular, the system and method disclosed herein enable a vehicle to transmit and receive message along the power line without use of the typical transceiver used within the industry that is in short supply and relatively expensive. Further, the system and method enable the vehicle to transmit and receive messages using different communication protocols thereby facilitating the use of a wider variety of devices on the vehicle.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
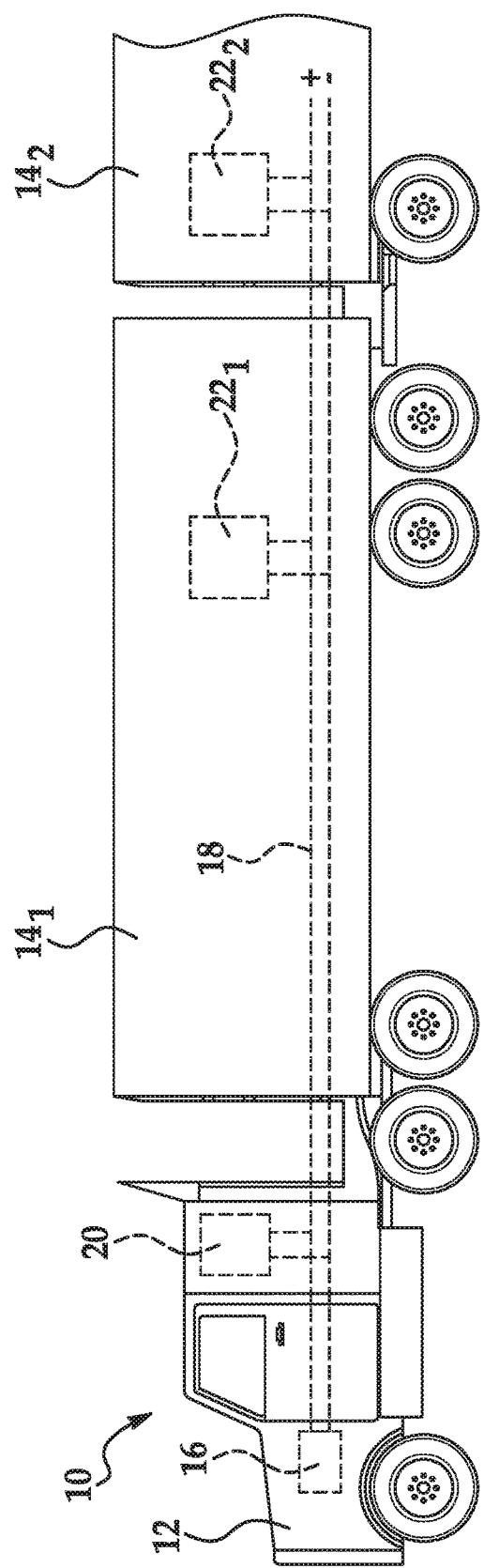
FIG. 1 is a diagrammatic view of a vehicle including a system for controlling communications between members of a tractor-trailer along a power line extending between the members in accordance with one embodiment of the present teachings.

Referring now to the drawings wherein like reference numerals are used to identify identical components in the various views, FIG. 1 illustrates a tractor-trailer 10. Tractor-trailer 10 (also referred to as a semi) contains a truck or tractor 12 and one or more trailers $14_1 \ldots 14_N$. Tractor 12 contains a power unit, such as an internal combustion engine, and steering and drive axles. Tractor 12 also contains a battery 16 for use in starting the power unit and in providing power to various accessory systems. Trailers $14_1 \ldots 14_N$ are provided to store freight and are detachably coupled to tractor 12. Although a pair of trailers 14 are shown in the illustrated embodiment, it should be understood that the number of trailers 14 attached to tractor 12 may vary.

Tractor 12 and trailers 14 may include various fluid and power lines that extend between tractor 12 and trailers 14 including power line 18. The fluid and power lines allow delivery of fluids and electrical power from tractor 12 to trailers 14 for use in, for example, tire pressure management, braking, and activation of tail lights on trailer 14. Power line 18 also forms part of a network used to transmit communications between various electronic systems 20, $22_1 \ldots 22_N$ on tractor 12 and trailers 14, respectively. Systems 20, 22 may comprise any of a wide variety of systems commonly employed on tractor-trailer 10 including, for example, anti-lock braking systems, collision avoidance systems, tire pressure monitoring and control systems, trailer load monitoring systems, and lighting systems. Power line 18 may enable transmission of data from one or more systems 22 on trailers 14 to a system 20 on tractor 12 including, for example, sensor readings indicative of the operation of an anti-lock braking system, the location of surrounding vehicles and infrastructure, pressure within the tires on a trailer 14, or a shift in the load carried by a trailer 14. Power line 18 may also enable transmission of commands and data from tractor 12 to trailers 14 for use in controlling elements of an anti-lock braking system, tire pressure control system or lighting system on one or more of trailers 14.

Figure 2:
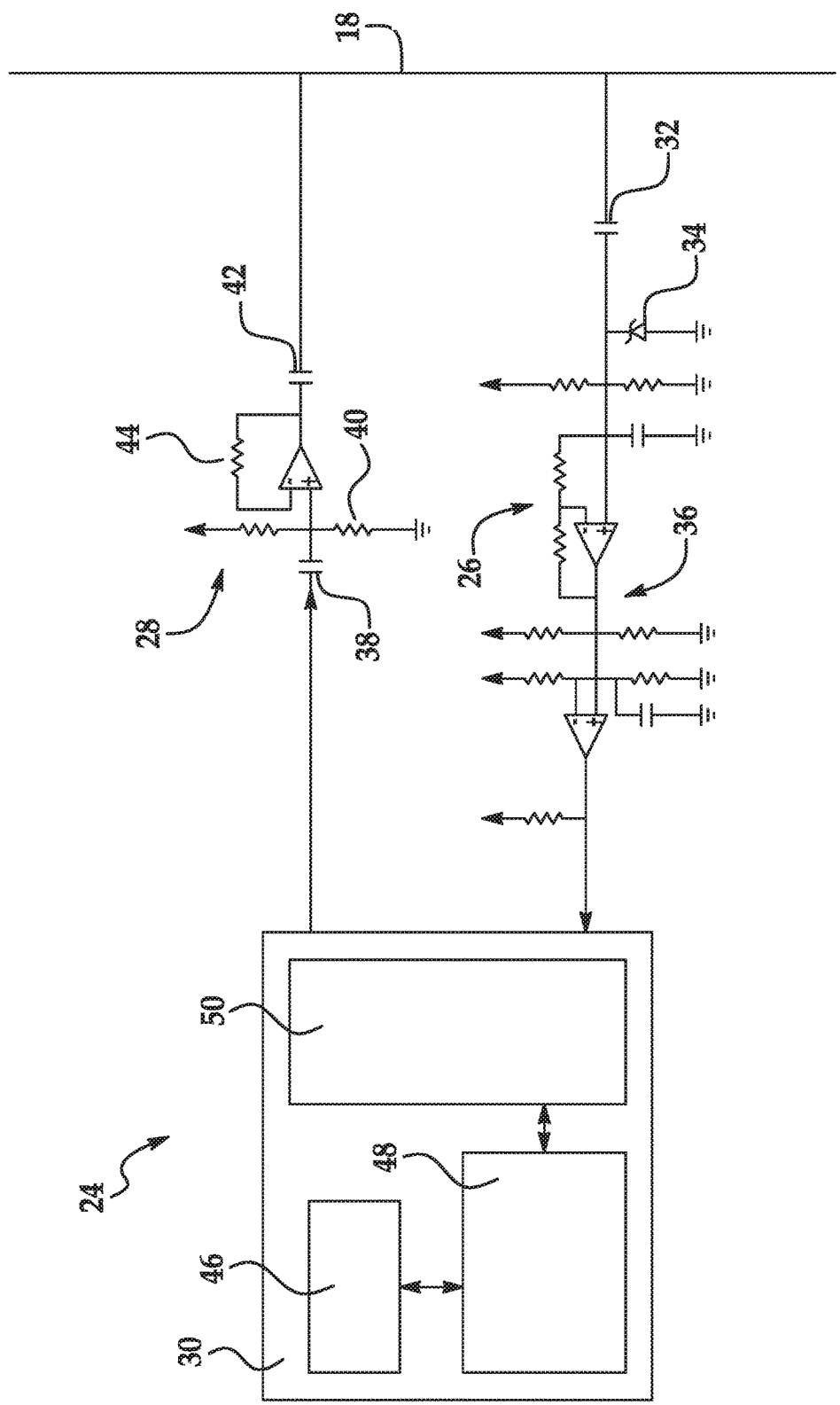
FIG. 2 is a diagrammatic and schematic view of a system for controlling communications between members of a tractor-trailer along a power line extending between the members in accordance with one embodiment of the present teachings.

Referring now to FIG. 2, each of systems 20, 22 may include a system 24 for controlling communications between members of tractor-trailer 10 (e.g., between a tractor 12 and a trailer 14 or between multiple trailers 14) along power line 18. System 24 may include an input signal conditioning circuit 26, an output signal conditioning circuit 28 and a controller 30.

Input signal conditioning circuit 26 is provided to condition signals received from power line 18 for use by controller 30. Circuit 26 includes a capacitor 32 that couples circuit 26 to power line 18 and a clamping diode downstream of the capacitor 32 including a Zener diode 34. It should be understood that inductive coupling could be used instead of capacitive coupling. Circuit 26 further includes an amplifier and conditioning stage 36 that is configured to convert the analog signal from power line 18 into a digital input signal to controller 30. In accordance with one embodiment, the digital input signal comprises a pulse-width modulated square wave signal.

Output signal conditioning circuit 28 is provided to condition signals output by controller 30 for transmission on power line 18. Circuit 28 includes a coupling capacitor 38 and biasing circuit 40 for signals received from controller 30. Circuit 28 also includes a capacitor 42 that couples circuit 28 to power line 18. It should again be understood that inductive coupling could be used instead of capacitive coupling. Circuit 28 further includes an amplifier and conditioning stage 44 that converts a digital output signal output by controller 30 into an analog output signal for use on power line 18. In accordance with one embodiment, the digital output signal output by controller 30 is a pulse width modulated square wave signal.

Controller 30 is provided to decode messages received from power line 18 and to encode messages for transmission on power line 18. Controller 30 may comprise a programmable microprocessor or microcontroller or may comprise an application specific integrated circuit (ASIC). Controller 30 may include a memory 46 and a central processing unit (CPU) 48. Controller 30 may also include an input/output (I/O) interface 50 including a plurality of input/output pins or terminals through which controller 30 may receive a plurality of input signals and transmit a plurality of output signals. The input signals may include signals received from input signal conditioning circuit 26 while the output signals may include signals transmitted to output signal conditioning circuit 28. In the illustrated embodiment, a single controller 30 is shown. It should be understood, however, that the functionality of controller 30 described herein may be divided among multiple sub-controllers. In one embodiment, controller 30 comprises a microcontroller offered for sale by Infineon Technologies AG under the trademark "AURIX" and having model number TC26x. It should be understood, however, that other vehicle microcontrollers may alternatively be used. In accordance with the present teachings, controller 30 may be configured with appropriate programming instructions (i.e., software or a computer program) to implement several steps in a method for controlling communications between tractor 12 and trailers 14 along power line 18 described below.

Figure 3:
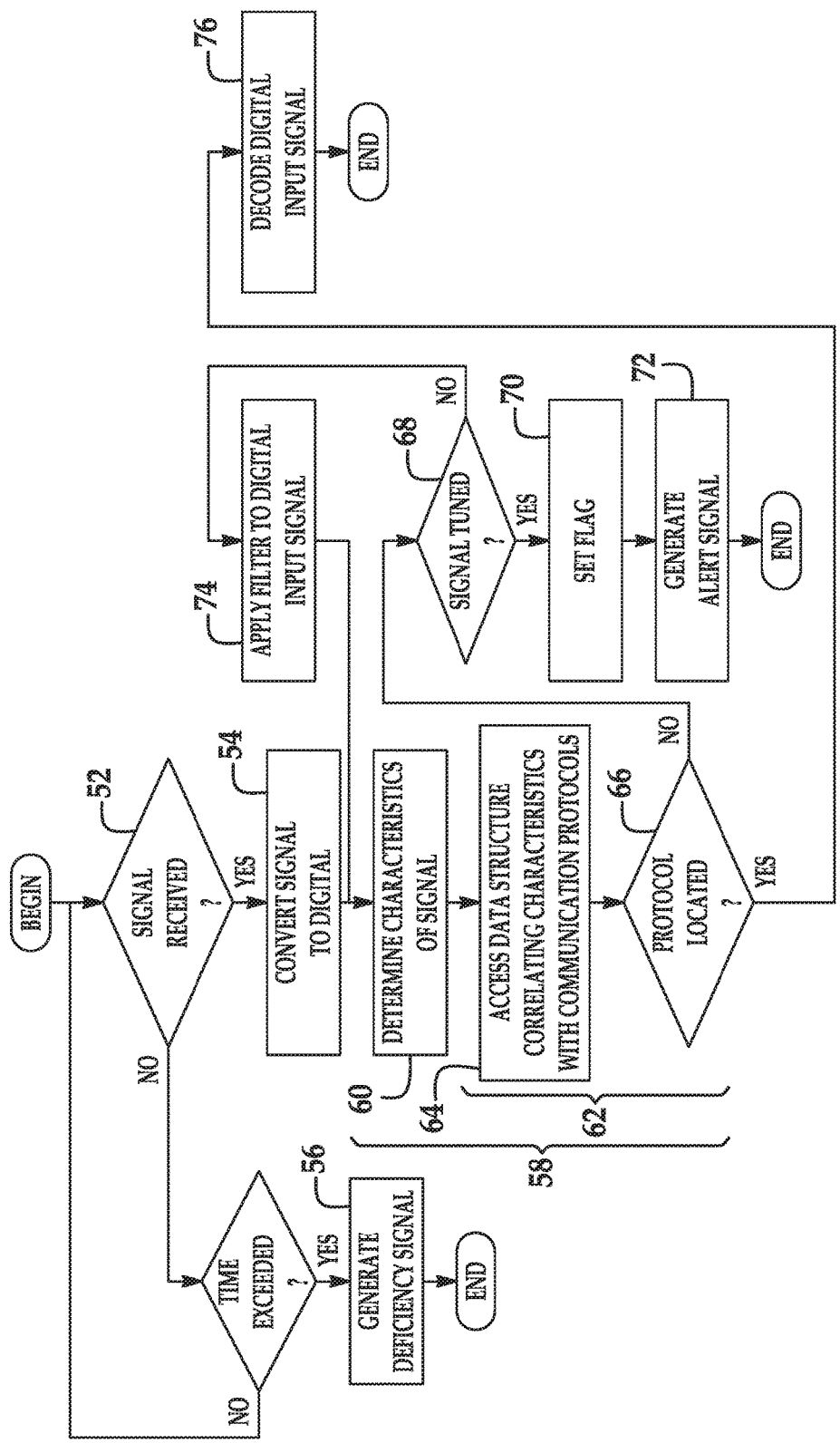
FIGS. 3-4 are flow chart diagrams illustrating several steps in a method for controlling communications between members of a tractor-trailer along a power line extending between the members in accordance with one embodiment of the present teachings.

Referring now to FIG. 3, one embodiment of a method for controlling communications between members of tractor-trailer 10 along power line 18 may begin with the steps 52, 54 of receiving an analog input signal from power line 18 and converting the analog input signal to a digital input signal. Referring to FIG. 2, amplifier and conditioning stage 36 converts the analog signal received on power line 18 into a square wave signal that may be input to controller 30. Referring again to FIG. 3, if no signal is received after a predetermined period of time (e.g., after controller 30 has generated a message for output on power line 18), controller 30 may be configured to perform the step 56 of generating a deficiency signal. The deficiency signal may be used in a variety of ways. The signal may be transmitted to an audio, visual or haptic warning system in the vehicle to provide a warning to the vehicle operator of a loss in communication or to a telematics system to transmit a signal to a fleet manager regarding the loss of communication. The signal may also be used by control systems in tractor-trailer 10 to alter control strategies. For example, where system 20 comprises an anti-lock braking system or stability control system and the deficiency signal indicates a lack of communication from related systems 22 in trailer 14, the deficiency signal may cause the system 20 to default to specific control algorithms (e.g., for additional safety) in view of the lack of information from trailers 14.

Where a signal has been received and converted to a digital input signal, the method may continue with the step 58 of identifying a communication protocol for the analog input signal from among a plurality of communication protocols responsive to the digital input signal formed by amplifier and conditioning stage 36. In accordance with one aspect of the disclosed system and method, controller 30 is able to decode messages using different communication protocols thereby facilitating use of devices on tractor-trailer 10 from a wider variety of manufacturers implementing different power line communication protocols. Step 58 may include several substeps 60, 62. In substep 60, controller 30 determines one or more characteristics of the digital input signal. Controller 30 is configured to determine various characteristics of the digital input signal including, for example, the frequency of the signal, the period of the signal, the duty cycle of the signal, the number of edges in the signal, the time a transition occurs, or the time between signals. The I/O interface 50 may include a timer input module (TIM) defining a plurality of input channels each configured to process a digital input signal from amplifier and conditioning stage 36 and to determine one or more characteristics of the signal. In one embodiment of the invention, controller 30 determines a duty cycle of the digital input signal and at least one of a period of the signal and a frequency of the signal. In substep 62, controller 30 determines the communication protocol for the analog input signal responsive to the characteristics of the digital input signal determined in substep 58. Substep 62 may itself have several substeps. In substep 64 controller 30 accesses a data structure that correlates values for the characteristics determined in substep 60 with specific communication protocols. The data structure may comprise a look-up table or similar structure and may be stored in memory 46. In substep 66, controller 30 attempts to locate a communication protocol for the analog input signal within the data structure responsive to the characteristics determined in substep 60. Each communication protocol will typically operate within a specific frequency range and signals transmitted in accordance with the protocol will have other common characteristics. If controller 30 is unable to determine a communication protocol based on the characteristics of the digital input signal determined in substep 60, controller 30 may perform several additional substeps to try and tune the digital input signal and remove noise from the signal that may have been imparted to the analog input signal on power line 18 (and, as a result, to the digital input signal). In substep 68, controller 30 determines whether a prior attempt to tune the digital input signal has already occurred. If the signal has been tuned and controller 30 was still unable to determine the communication protocol, controller 30 may perform the substeps 70, 72 of setting a flag in a memory such as memory 46 and generating an alert signal responsive to the flag. The flag may be used by controller 30 or another system controller to identify new communication protocols, errors in the system as indicated by testing (or "fuzzing") attempts, or attempts to hack, attack or otherwise infiltrate the communications system. The alert signal may be configured to activate a warning system such as an audio, visual or haptic warning system in tractor 12 for an operator of tractor-trailer 10 or a telematics system that broadcasts a signal that can be received by a fleet manager. If the digital input signal has not been tuned previously, controller 30 may perform the sub step 74 of applying a filter to the signal in order to generate a filtered digital input signal and then repeat substeps 60, 62 using the filtered digital input signal. To increase efficiency, controller 30 may be configured to select the type of filtering based on the characteristics of the signal and/or previous attempts to tune similar signals (e.g., by applying the most recently used filtering).

Figure 4:
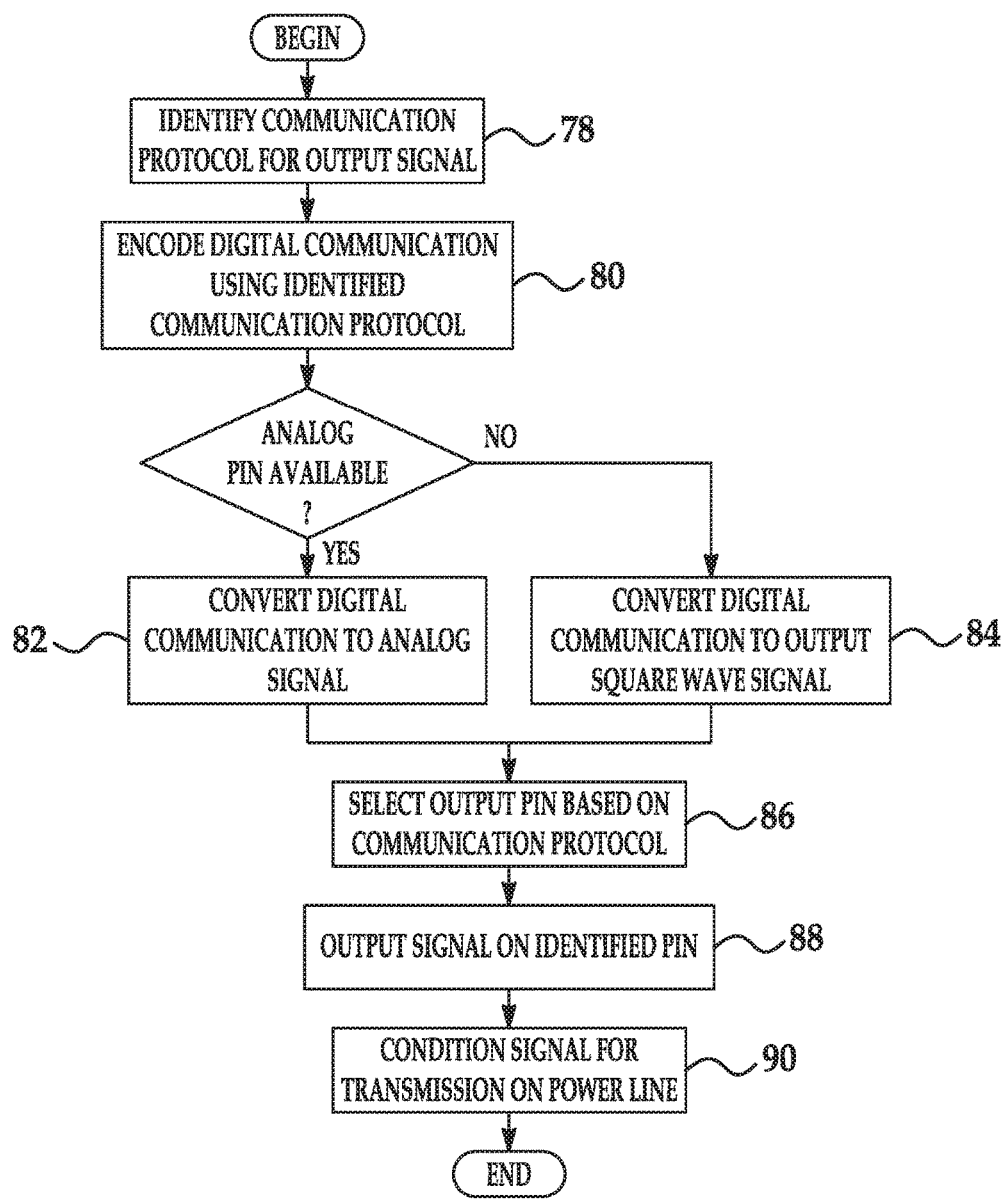

If controller 30 is able to locate a communication protocol for the signal in substep 62, controller 30 may then perform the step 76 of decoding the digital input signal using the identified communication protocol. Depending on the nature of the decoded message, controller 30 may take any of a variety of actions including processing of data in the message, directing the system 20 or 22 including controller 30 to take some action, and generating and transmitting signals to others systems such as system 20 or 22 through power line 18. Referring now to FIG. 4, for example, controller 30 may be configured in some embodiments to perform several steps associated with generating and transmitting another message through power line 18.

In step 78, controller 30 identifies a communication protocol for the signal to be formed from among a plurality of communication protocols. If controller 30 is generating a message to a device or system in response to a message received from the same device or system, controller 30 may simply determine that the same communication protocol identified in decoding the message received from that device or system should be used. If controller 30 is generating a message to a different device or system, controller 30 may access a data structure that correlates the intended recipient of the message with the communication protocol used by that recipient and identify the appropriate communication protocol. The data structure may again be stored in memory 46 or another memory. In step 80, controller 30 encodes the communication using the communication protocol determined in step 78.

Because controller 30 is generating a communication for transmission along power line 18, the communication must be converted to an analog output signal. Accordingly, controller 30 may perform steps to convert the communication to an analog output signal or to generate an output signal that can be converted to an analog output signal by output signal conditioning circuit 28. In some embodiments, controller 30 may itself include a digital to analog converter and, if an analog output pin on controller 30 is available, controller 30 may, in step 82, convert the digital communication to an analog output signal prior to output by controller 30. In other embodiments—or when an analog output pin on controller 30 is unavailable—controller 30 may, in step 84, convert the digital communication to a pulse width modulated output square wave signal. The I/O interface 50 may include a timer output module (TOM) defining a plurality of output channels each configured to process a communication to form a square wave or other output signal (in the case of the specific Aurix TC26x controller referenced above, the time output module may comprise an advanced routing unit timer output module known by the abbreviation "ATOM"). Each channel may have a counter with a rate based on a clock signal from within controller 30 and registers that include characteristics (e.g., the duty cycle and period) of the signal to be generated for use in forming a signal such as a square wave output signal.

Because controller 30 is capable of generating messages using a variety of communication protocols, different types or levels of signal conditioning may be required before a signal output by controller 30 can be transmitted along power line 18. Therefore, in step 86, controller 30 may select a pin on controller 30 from among a plurality of pins based on the communication protocol determined in step 78. Different pins on controller 30 may be connected to different output signal conditioning circuits 28 for use in conditioning signals using different communication protocols. In steps 88 and 90, controller 30 outputs a signal on the pin identified in step 86 and the signal is conditioned using an output signal conditioning circuit such as circuit 28 prior to transmission on power line 18. In the illustrated embodiment, circuit 28 is configured to receive an output square wave signal from controller 30 and covert the signal to an analog output signal for transmission on power line 18. In particular, operational amplifier and conditioning stage 44 converts the output square wave signal to an analog output signal for transmission on power line 18.

A system and method for controlling communications between members of a tractor-trailer 10 along a power line 18 extending between the members in accordance the present teachings represent an improvement as compared to conventional systems and methods. In particular, the system and method disclosed herein enable a vehicle to transmit and receive message along the power line 18 without use of the typical transceiver used within the industry that is in short supply and relatively expensive. Further, the system and method enable the vehicle to transmit and receive messages using different communication protocols thereby facilitating the use of a wider variety of devices on the vehicle.

While the invention has been shown and described with reference to one or more particular embodiments thereof, it will be understood by those of skill in the art that various changes and modifications can be made without departing from the spirit and scope of the invention.

What is claimed is:

1. A system for controlling communications between members of a tractor-trailer along a power line extending between the members, comprising:
    an input signal conditioning circuit mounted on one member of the tractor-trailer and including a first amplifier and conditioning stage configured to convert an analog input signal received from another member of the tractor-trailer along the power line to a digital input signal;
    a controller configured to
        receive the digital input signal;
        identify a first communication protocol for the analog input signal from among a plurality of communication protocols identifiable by the controller responsive to the digital input signal; and
        decode the digital input signal using the first communication protocol.

2. The system of claim 1 wherein the controller is further configured, in identifying the first communication protocol, to:
    determine a first characteristic of the digital input signal; and,
    determine the first communication protocol for the analog input signal responsive to the first characteristic.

3. The system of claim 2 wherein the controller is further configured, in identifying the first communication protocol, to:
    determine a second characteristic of the digital input signal; and,
    determine the first communication protocol for the analog input signal responsive to the first and second characteristics.

4. The system of claim 3 wherein the first characteristic comprises one of a period and a frequency of the digital input signal and the second characteristic comprises a duty cycle of the digital input signal.

5. The system of claim 2 wherein the controller is further configured, in determining the first communication protocol, to:
    access a data structure correlating values for the first characteristic with the plurality of communication protocols; and,
    locate the first communication protocol for the analog input signal in the data structure responsive to a value of the first characteristic.

6. The system of claim 5 wherein the controller is further configured to
    apply a filter to the digital input signal when the controller is unable to locate the first communication protocol in the data structure responsive to the value of the first characteristic in order to generate a filtered digital input signal;
    determine a first characteristic of the filtered digital input signal; and,
    determine the first communication protocol for the analog input signal responsive to the first characteristic of the filtered digital input signal.

7. The system of claim 6 wherein the controller is further configured to:
    set a flag in a memory when the controller is unable to locate the first communication protocol in the data structure responsive to the value of the first characteristic of the filtered digital input signal; and,
    generate an alert signal responsive to the flag, the alert signal configured to activate a warning system.

8. The system of claim 1 wherein the controller is further configured to generate a deficiency signal when the digital input signal is not received for a predetermined period of time.

9. The system of claim 1 wherein the controller is further configured to:
    identify a second communication protocol for an output signal on the power line from among the plurality of communication protocols; and,
    encode a digital communication using the second communication protocol.

10. The system of claim 9 wherein the second communication protocol is identical to the first communication protocol.

11. The system of claim 9 wherein the controller is further configured to select a pin of the controller from a plurality of pins responsive to the second communication protocol and to output the digital communication on the selected pin.

12. The system of claim 9, further comprising an output signal conditioning circuit including a second amplifier and conditioning stage and wherein the controller is further configured to convert the digital communication to an analog output signal using a digital to analog converter within the controller and the output signal conditioning circuit is configured to amplify and condition the analog output signal for transmission on the power line in accordance with the second communication protocol.

13. The system of claim 9, further comprising an output signal conditioning circuit including a second amplifier and conditioning stage and wherein the controller is further configured to convert the digital communication to a digital output signal output by the controller and the output signal conditioning circuit is configured to convert the digital output signal generated by the controller to an analog output signal for transmission on the power line.

14. A method for controlling communications between members of a tractor-trailer along a power line extending between the members, comprising the steps of:
    converting an analog input signal received from one member of the tractor-trailer along the power line to a digital input signal using an input signal conditioning circuit mounted on another member of the tractor-trailer including a first amplifier and conditioning stage;
    identifying a first communication protocol for the analog input signal from among a plurality of communication protocols identifiable by a controller responsive to the digital input signal; and
    decoding the digital input signal using the first communication protocol.

15. The method of claim 14 wherein the step of identifying the first communication protocol includes the substeps of:
    determining a first characteristic of the digital input signal; and,
    determining the first communication protocol for the analog input signal responsive to the first characteristic.

16. The method of claim 15 wherein the step of identifying the first communication protocol includes the substeps of:
    determining a second characteristic of the digital input signal; and, determining the first communication protocol for the analog input signal responsive to the first and second characteristics.

17. The method of claim 16 wherein the first characteristic comprises one of a period and a frequency of the digital input signal and the second characteristic comprises a duty cycle of the digital input signal.

18. The method of claim 15 wherein the step of determining the first communication protocol includes the steps of:
    accessing a data structure correlating values for the first characteristic with the plurality of communication protocols; and,
    locating the first communication protocol for the analog input signal in the data structure responsive to a value of the first characteristic.

19. The method of claim 18, further comprising the steps of:
    applying a filter to the digital input signal when the first communication protocol is not located in the data structure responsive to the value of the first characteristic in order to generate a filtered digital input signal;
    determining a first characteristic of the filtered digital input signal; and,
    determining the first communication protocol for the analog input signal responsive to the first characteristic of the filtered digital input signal.

20. The method of claim 19, further comprising the steps of:
    setting a flag in a memory when the first communication protocol is not located in the data structure responsive to the value of the first characteristic of the filtered digital input signal; and,
    generating an alert signal responsive to the flag, the alert signal configured to activate a warning system.

21. The method of claim 14, further comprising the step of generating a deficiency signal when the digital input signal is not received for a predetermined period of time.

22. The method of claim 14, further comprising the steps of:
    identifying a second communication protocol for an output signal on the power line from among the plurality of communication protocols identifiable by the controller; and,
    encoding a digital communication using the second communication protocol.

23. The method of claim 22 wherein the second communication protocol is identical to the first communication protocol.

24. The method of claim 22, further comprising the steps of:
    selecting a pin on a controller from a plurality of pins responsive to the second communication protocol; and
    outputting the digital communication on the selected pin.

25. The method of claim 22, further comprising the steps of:
    converting the digital communication to an analog output signal using a digital to analog converter within a controller; and
    amplifying and conditioning the analog output signal for transmission on the power line in accordance with the second communication protocol using an output signal conditioning circuit including a second amplifier and conditioning stage.

26. The method of claim 22, further comprising the steps of:
    converting the digital communication to a digital output signal for output by a controller; and
    converting the digital output signal to an analog output signal for transmission on the power line using an output signal conditioning circuit including a second amplifier and conditioning stage.

* * * * *